(12) United States Patent
Braunstein et al.

(10) Patent No.: US 7,642,978 B2
(45) Date of Patent: Jan. 5, 2010

(54) METHOD AND APPARATUS FOR STEERING AND STABILIZING RADIO FREQUENCY BEAMS UTILIZING PHOTONIC CRYSTAL STRUCTURES

(75) Inventors: Mark David Braunstein, Centreville, VA (US); Robert Scott Winsor, Round Hill, VA (US); Peter Charles Freeland, South Riding, VA (US); Shane William Pixton, Ashburn, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 330 days.

(21) Appl. No.: 11/841,305

(22) Filed: Aug. 20, 2007

(65) Prior Publication Data

US 2008/0291101 A1 Nov. 27, 2008

Related U.S. Application Data

(63) Continuation-in-part of application No. 11/734,026, filed on Apr. 11, 2007, now Pat. No. 7,463,214, and a continuation-in-part of application No. 11/693,817, filed on Mar. 30, 2007.

(51) Int. Cl.
*H01Q 19/06* (2006.01)
(52) U.S. Cl. .................................................. 343/754
(58) Field of Classification Search ......... 343/753–754, 343/911 R, 909; 359/321–322
See application file for complete search history.

(56) References Cited

U.S. PATENT DOCUMENTS 3,226,721 A 12/1965 Gould (Continued)

FOREIGN PATENT DOCUMENTS

DE 19955205 A1 5/2001

OTHER PUBLICATIONS

R. Windsor, M. Braustein, Conformal Beam Steering Apparatus for Simultaneous Manipulation of Optical and Radio Frequency Signals, Proceedings of the Spie- The International Society for Optical Engineering Spie-Int. Soc. Opt. Eng USA, vol. 6215, 62150G (2006).

(Continued)

*Primary Examiner*—Huedung Mancuso
(74) *Attorney, Agent, or Firm*—Edell, Shapiro & Finnan, LLC

(57) ABSTRACT

An RF beam steering device employs a prism assembly to steer an RF beam and a compensation device to address undesirable movement of the beam steering device. The prism assembly includes a plurality of dielectric prisms each with an associated impedance matching layer. The dielectric prisms are rotated relative to each other to steer the RF beam in a desired direction and further to compensate for movement of the beam steering device itself. The prisms include a plurality of individual panels with drilled or slotted openings that are arranged to create a periodic photonic crystal structure within a defined region. This configuration effectively alters the dielectric constant over any one particular region of a panel, thereby altering the level of diffraction possible for a specified panel thickness. The openings within each stacked panel are overlapped to produce the required level of diffraction and refractive index gradient. Motors rotate the prisms relative to each other to the correct orientation for steering the RF beam in a desired manner.

17 Claims, 9 Drawing Sheets

U.S. PATENT DOCUMENTS

| | | | |
|---|---|---|---|
| 4,480,254 A * | 10/1984 | Spencer et al. | 343/708 |
| 5,541,613 A | 7/1996 | Lam et al. | |
| 5,623,360 A * | 4/1997 | Gesell et al. | 359/287 |
| 6,344,937 B1 | 2/2002 | Sparrold et al. | |
| 6,359,681 B1 | 3/2002 | Housand et al. | |
| 6,538,621 B1 * | 3/2003 | Sievenpiper et al. | 343/909 |
| 6,812,903 B1 * | 11/2004 | Sievenpiper et al. | 343/753 |
| 7,239,463 B2 * | 7/2007 | Braun et al. | 359/837 |
| 2002/0084869 A1 | 7/2002 | White | |
| 2005/0195505 A1 | 9/2005 | Braun et al. | |
| 2005/0213964 A1 | 9/2005 | Kreger et al. | |
| 2006/0125713 A1 | 6/2006 | Thevenot et al. | |
| 2006/0202909 A1 | 9/2006 | Nagai | |

OTHER PUBLICATIONS

P. Vodo, P.V. Parimi, W. T. Lu, and S. Sridhar, Microwave photonic crystal with tailor-made negative refractive index, Applied Physics Letter vol. 85, No. 10 (Jan. 1, 2004), pp. 1858-1860.

F. Daschner, et al., Photonic crystals as host material for a new generation of microwave components, Advances In Radio Science, vol. 4 (2006), pp. 17-19.

* cited by examiner

METHOD AND APPARATUS FOR STEERING AND STABILIZING RADIO FREQUENCY BEAMS UTILIZING PHOTONIC CRYSTAL STRUCTURES

CROSS-REFERENCE TO RELATED APPLICATIONS

This application is a Continuation-In-Part of U.S. patent application Ser. No. 11/734,026, entitled "Method and Apparatus for Steering Radio Frequency Beams Utilizing Photonic Crystal Structures" and filed Apr. 11, 2007, which is a Continuation-In-Part of U.S. patent application Ser. No. 11/693,817, entitled "Radio Frequency Lens and Method of Suppressing Side-Lobes" and filed Mar. 30, 2007, the disclosures of which are incorporated herein by reference in their entireties.

BACKGROUND OF THE INVENTION

1. Technical Field

The present invention pertains to steering radio frequency (RF) beams. In particular, the present invention pertains to a device utilizing photonic crystal structures (e.g., prisms, etc.) to steer or direct RF beam transmissions.

2. Discussion of Related Art

Radio frequency (RF) transmission systems generally employ dish or other antennas that reflect RF signals to transmit an outgoing collimated beam. The beam may be steered via several conventional techniques. For example, motorized gimbal assemblies may be employed that use two motors and associated feedback circuitry to physically move the antenna (both in azimuth and elevation) to steer a radio frequency (RF) beam. However, gimbal-steered assemblies are typically heavy and bulky, and require substantial amounts of power to turn the antenna and maintain alignment of the radio beam. In many cases, the weight of the gimbal-steered assembly and antenna exceed the load rating of the platform. Further, the closed-loop feedback system used to stabilize a combined antenna and gimbal-steered assembly is complex and requires customization for each installation. In addition, gimbal-steered systems require extremely high levels of mechanical stability for applications involving narrow radio beam widths (e.g., millimeter wave radio systems).

Phased-array steering systems may also be employed to steer an RF beam. Generally, theses types of systems employ numerous transmit/receive modules that each provide a portion of the resultant RF beam. The beam portions are combined and collectively produce the resultant RF beam transmitted or steered in the desired direction. However, these types of systems require a large number of electronic subsystems (e.g., one for each radiating element or transmit/receive module) to electronically steer the beam. Phased-array beam steering systems further broaden the RF beam when moved off of boresight and increase side-lobe levels. Side-lobes are the portion of an RF beam that are a by-product of beam propagation from the aperture of the antenna. Typically, suppression of the side-lobe energy is critical for reducing the probability that the transmitted beam is detected (e.g., an RF beam is less likely to be detected, jammed or eavesdropped in response to suppression of the side-lobe energy).

In addition, dielectric wedges may be used to steer radio waves through prismatic diffraction principles. The wedges are preferably constructed from homogeneous structures. However, these types of homogenous structures require that the wedges be machined from blocks of suitable materials. Typically, this involves the machining of rectangular blocks to form wedges of a specified angle, thereby inherently wasting the material.

SUMMARY OF THE INVENTION

According to present invention embodiments, an RF beam steering device employs a prism assembly to steer an RF beam. The prism assembly includes a plurality of dielectric prisms each with an associated impedance matching layer to deflect the RF beam over a controlled range. The dielectric prisms are rotated relative to each other to steer the RF beam. The prisms include a plurality of individual panels with drilled or slotted openings that are arranged to produce a photonic crystal structure optimized for a specific radio frequency. The openings are arranged in each panel to effectively create a periodic photonic crystal structure within a defined region. This configuration effectively alters the dielectric constant over any one particular region of a panel, thereby altering the level of diffraction possible for a specified panel thickness. The openings within each stacked panel are overlapped to produce the required level of diffraction and refractive index gradient. Motors rotate the prisms relative to each other to the correct orientation for steering the RF beam in a desired manner.

The RF beam steering device provides several advantages. In particular, the device utilizes an advanced steering technique. Rather than physically moving an entire antenna in both azimuth and elevation to achieve motion compensation, the device simply manipulates the RF beam. The beam movement is accomplished by rotation of two or more dielectric prisms. This simplifies the platform dynamics of the combined antenna/prism steering assembly. For example, the device may employ smaller, lightweight and lower power motors and a simplified open-loop control system to achieve the same or comparable level of performance of RF beam steering as the gimbal-steered systems. Further, diffraction in a dielectric media may be realized by varying the index of refraction across the surface of a flat structure. This allows the prisms to be fabricated using conventional circuit board laminate materials modified by panel drilling and slotting procedures. The diffraction angle may be varied by controlling the number and thickness of stacked laminate panels, the number and spacing of drilled or slotted openings in a panel, and the dielectric constant of the laminate. The hole and slot patterns control the performance of the prism photonic crystal structure. In addition, the inherent lightweight nature of the prism dielectric material (and holes defined therein) enables creation of an RF prism that is lighter than a corresponding solid counterpart.

Embodiments of the present invention may also provide a compensation mechanism to account for sway or instability with regard to a platform to which the prisms are mounted. The compensation mechanism may include accelerometers to detect roll, pitch or yaw. Multi- or single-axis accelerometers may be employed. Tilt sensors may also be employed. Alternatively, a mechanical system, including, for example, weighted pendulums may be coupled to the prisms and move in a direction opposite to the movement of the platform thereby self-correcting the position of the prisms.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
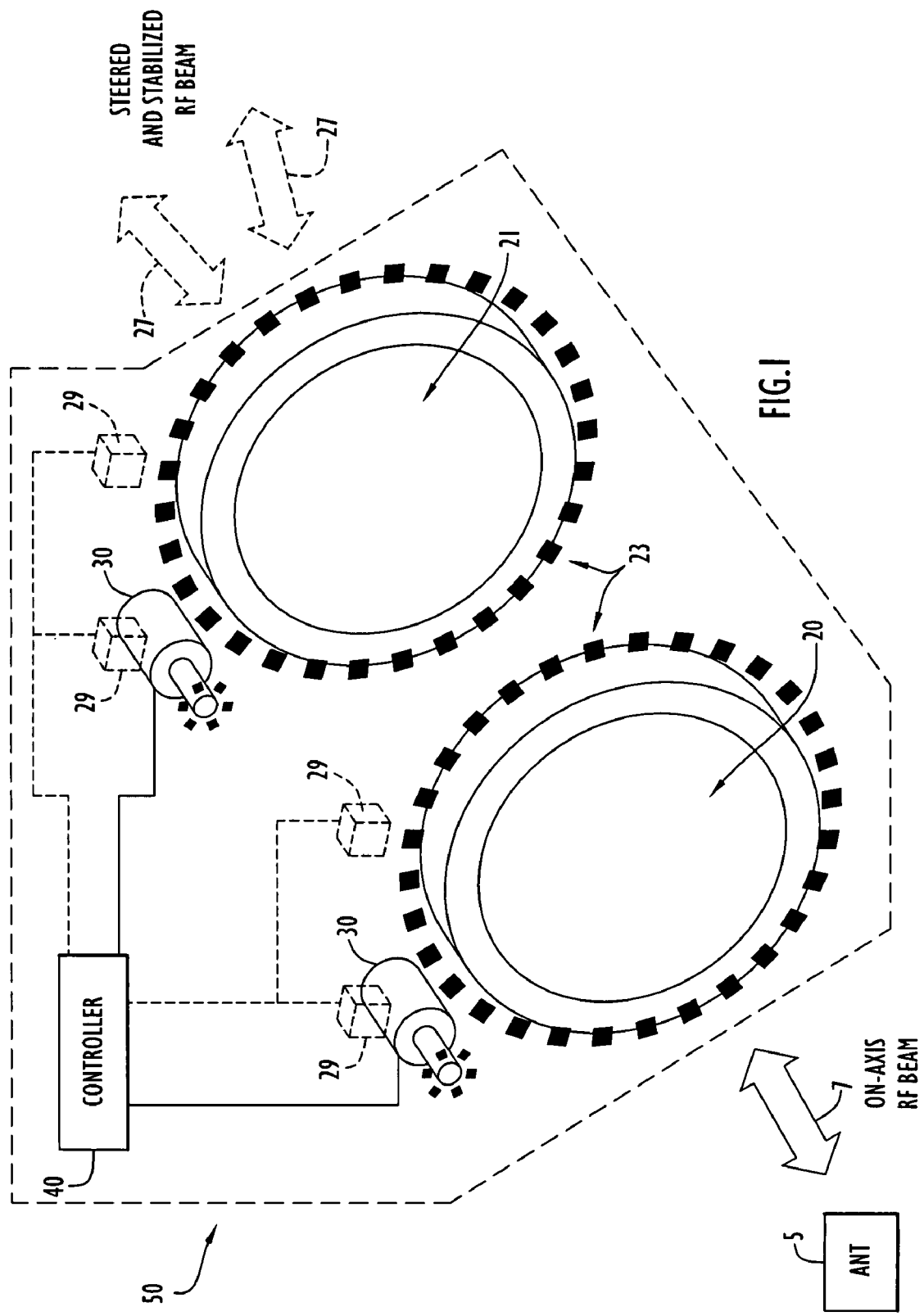
FIG. 1 is a schematic block diagram of the beam steering device according to a present invention embodiment.

The present invention embodiments pertain to a radio frequency (RF) beam steering device that includes a plurality of prisms each with a photonic crystal structure. The prisms are rotated relative to each other to steer an RF beam in a desired manner as illustrated in FIG. 1. Specifically, beam steering device 50 includes a plurality of prisms 20, 21, a plurality of rotating assemblies 23, a plurality of motors 30 and a controller 40. Each prism 20, 21 is fabricated using dielectric materials (e.g., RF laminate, etc.) suitable for use in radio frequency applications. The prisms are preferably configured to enable the dielectric materials to produce electromagnetic fields that deflect the beam a desired amount in a particular axis of motion as described below. Each prism includes a prism layer to refract the beam and one or more impedance matching layers to enhance radio wave propagation by minimizing reflections. Arrays of hole or slot patterns are defined within the dielectric materials of the prism and impedance matching layers to create photonic crystal structures that vary the index of refraction (e.g., proportional to the dielectric constant of the material) over the surface of the prism as described below. The prism layers are bonded together into a single structure, where successive layers of dielectric materials, each with a specific dielectric constant, may be stacked with the appropriate quantity of adhesive layers (e.g., pre-reg sheets, etc.) to increase the diffraction angle of the prism. The impedance matching layers transform the free-space plane wave impedance to match the impedance of the higher dielectric constant material. By way of example only, the beam steering device is described with respect to two sequential (e.g., first and second) prisms 20, 21. However, the beam steering device may include two or more prisms to perform beam steering with the desired deflection angle.

Prisms 20, 21 are each mounted on a corresponding rotating assembly 23. The rotating assemblies may be implemented by any conventional or other assemblies, and typically include a rotating mechanism (e.g., rotating ring, platform or other suitable structure) to secure and rotate a prism. The rotating assemblies are each manipulated by a corresponding motor 30 to rotate the prisms relative to each other to produce the desired deflection angle for the beam. The motors may be implemented by any conventional or other motors or actuators to rotate the prisms. By way of example, the beam steering device includes two rotating assemblies disposed in a manner to position prisms 20, 21 coincident each other. This enables an RF beam to sequentially traverse the prisms for desired steering as described below.

Motors 30 are controlled by controller 40 to rotate the prisms in a certain manner relative to each other to achieve a desired beam steering. The controller may be implemented by any conventional or other controller or processor (e.g., microprocessor, controller, control circuitry, logic, etc.), and is basically utilized within a feedback loop to control prism rotation. For example, the mounting assemblies and/or motors may include one type of sensors 29 to measure and coordinate prism rotation (other types of sensors are described later herein). The sensors may be implemented by any conventional or other sensors (e.g., encoders, potentiometers, etc.) to measure the prism rotation and/or other system conditions. These measurements are provided to the controller to enable control of prism rotation and steering of the beam.

Basically, an RF beam 7 is provided to beam steering device 50 from a source, such as an antenna 5 transmitting the RF beam. The RF beam traverses first prism 20 and is refracted by the electromagnetic field produced from the photonic crystal structures of the prism. The refracted RF beam subsequently traverses second prism 21 and is again refracted by the electromagnetic field produced from the prism photonic crystal structures. The orientation of prisms 20, 21 relative to each other enables the prisms to collectively produce a resulting RF beam 27 refracted or steered in the desired direction. Controller 40 controls motors 30 to rotate the prisms in a manner to achieve the desired steering effect based on the analysis described below (e.g., Equations 1-11 to achieve the desired steering angle, $\theta_S$ or $\phi$). The controller may manipulate both prisms simultaneously to achieve the desired orientation, or one prism may be stationary while the other prism is manipulated.

Figure 2:
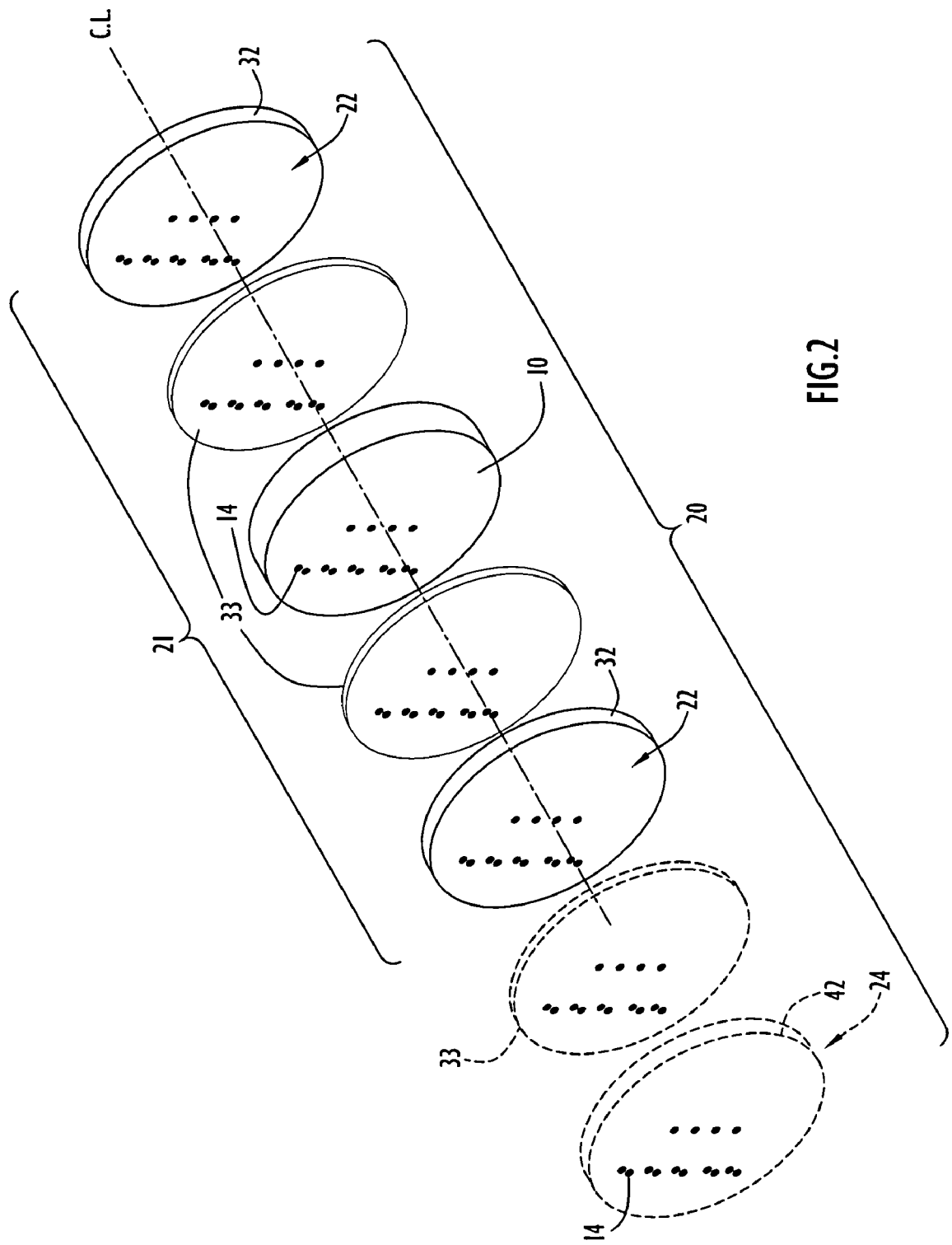
FIG. 2 is a diagrammatic illustration of an exemplary prism of the beam steering device of FIG. 1 according to an embodiment of the present invention.

An exemplary prism structure according to an embodiment of the present invention is illustrated in FIG. 2. Specifically, each prism 20, 21 includes a prism portion or layer 10 and a plurality of impedance matching layers 22. First prism 20 may further include an absorbing or apodizing layer or mask 24 to reduce side-lobes. These layers each preferably include a photonic crystal structure (e.g., dielectric or absorbing materials with a series of holes defined therein) as described below. Prism layer 10 is disposed between and attached to impedance matching layers 22 via pre-preg sheets 33 (e.g., glue or other adhesive sheets) and/or other suitable adhesives. An RF beam enters prisms 20, 21 and traverses an initial impedance matching layer 22 and prism layer 10, and exits through the remaining impedance matching layer as a steered beam. Apodizing mask 24 may be attached to first prism 20, via pre-reg sheet 33, to a surface of an impedance matching layer 22 that faces a signal source (e.g., antenna 5 as viewed in FIG. 1). In this case, the RF beam enters first prism 20 and traverses apodizing mask 24, an initial impedance matching layer 22 and prism layer 10, and exits through the remaining impedance matching layer as a steered beam. However, the layers of prisms 20, 21 may be of any quantity and may be arranged in any suitable fashion. Further, additional dielectric and/or absorbing materials and/or pre-reg sheets may be used to adjust the overall thickness of one or more prism layers.

Figure 3:
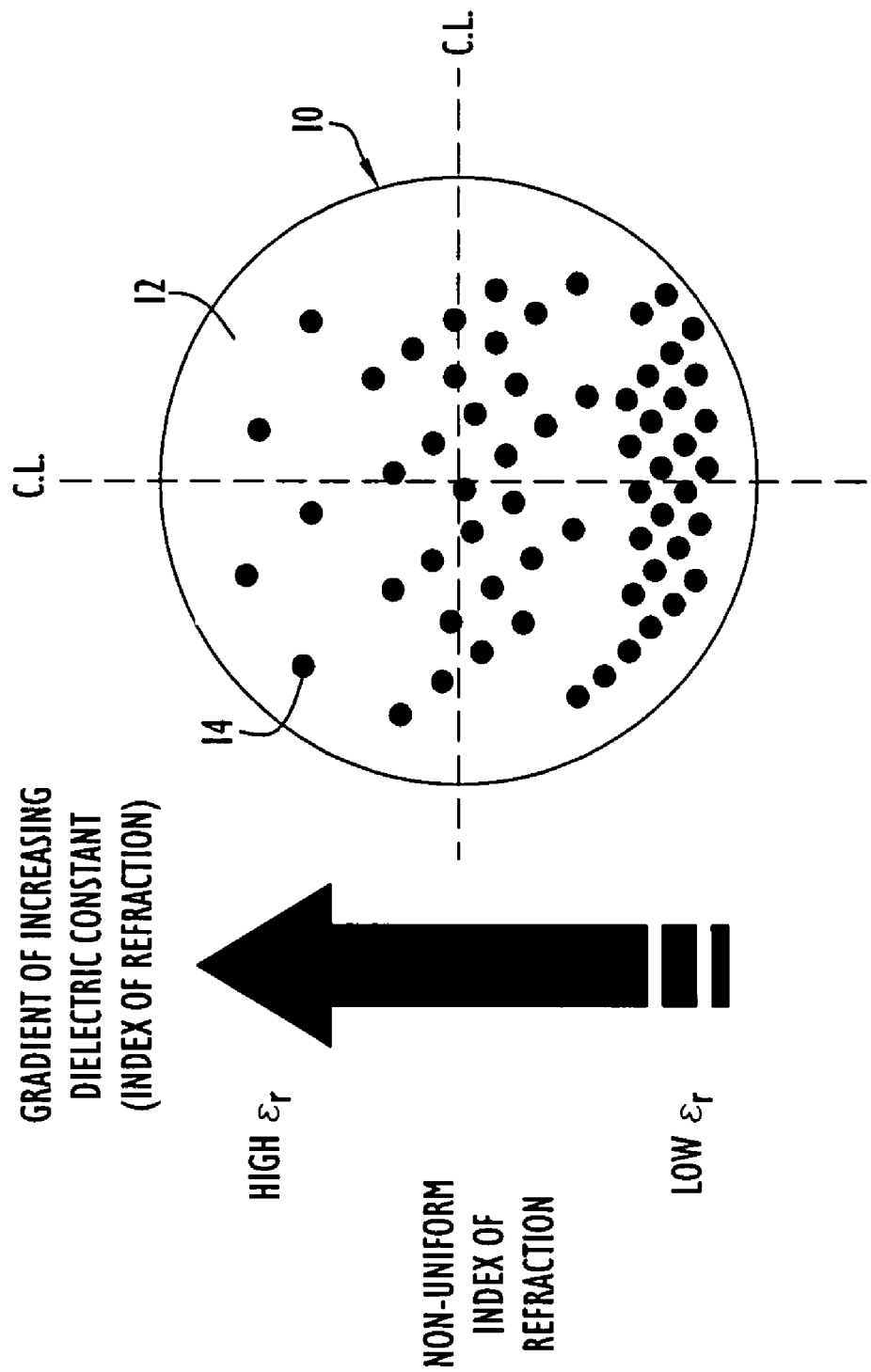
FIG. 3 is a diagrammatic illustration of an exemplary photonic crystal structure of the type employed by the prism of FIG. 2 according to an embodiment of the present invention.
Figure 4A:
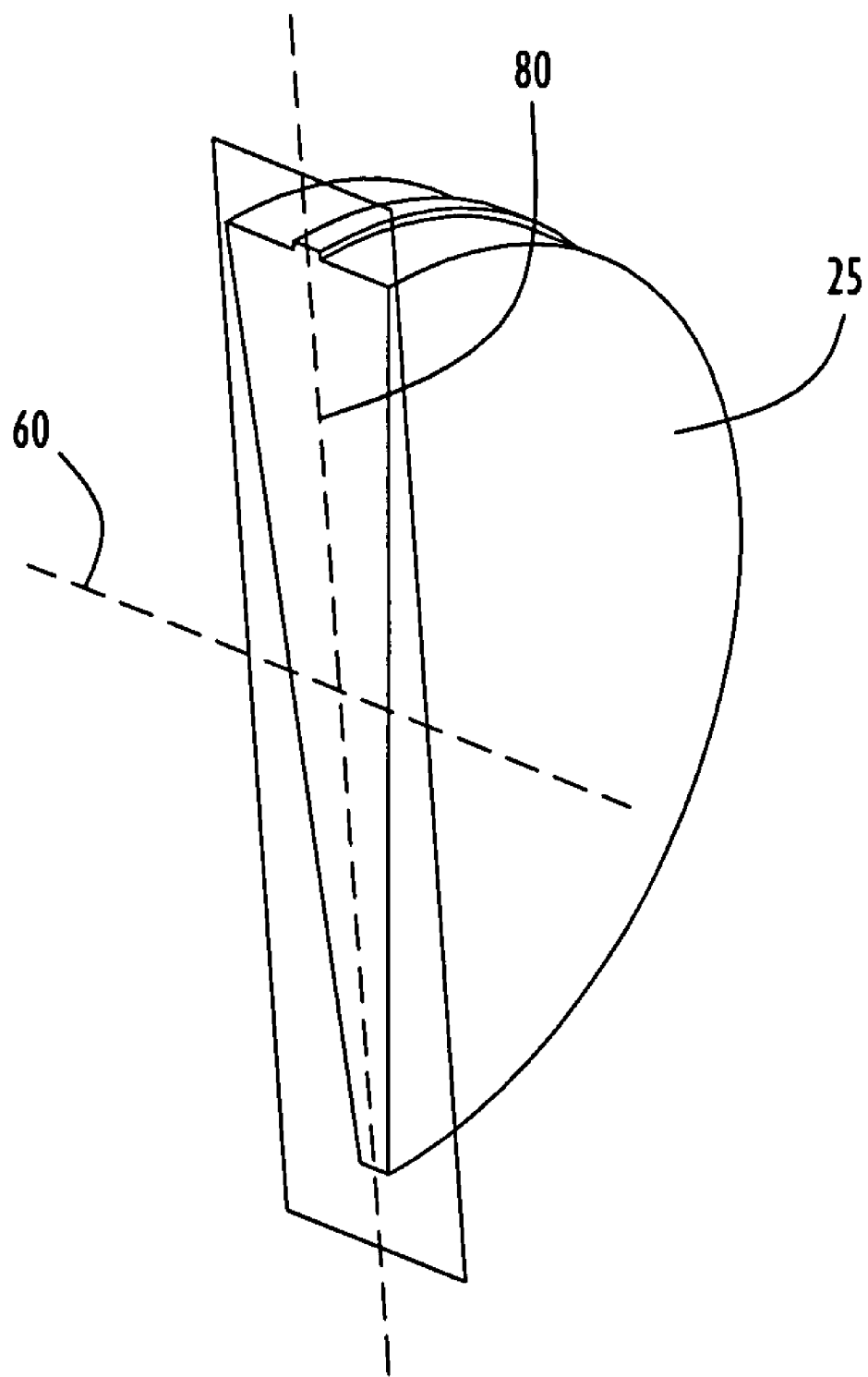
FIG. 4A is a perspective view in partial section of an exemplary wedge prism.
Figure 4B:
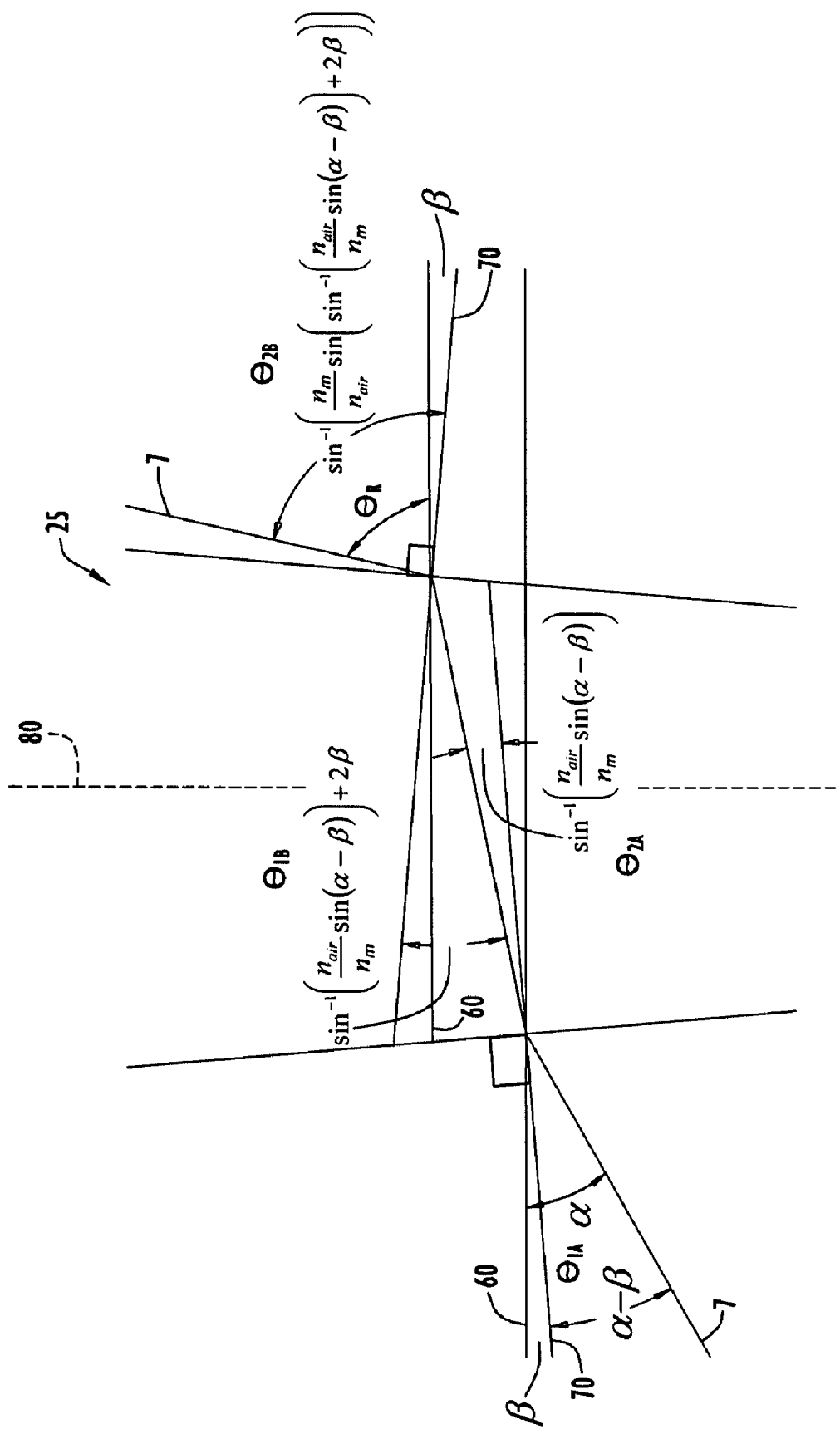
FIG. 4B is a diagrammatic illustration of a beam being steered by the exemplary wedge prism of FIG. 4A.

Prism layer 10 includes a photonic crystal structure. An exemplary photonic crystal structure for prism layer 10 is illustrated in FIG. 3. Initially, photonic crystal structures utilize various materials, where the characteristic dimensions of, and spacing between, the materials are typically on the order of, or less than, the wavelength of a signal (or photon) of interest (e.g., for which the material is designed). The materials typically include varying dielectric constants. Photonic crystal structures may be engineered to include size, weight and shape characteristics that are desirable for certain applications. Specifically, prism layer 10 is formed by defining a series of holes 14 within a parent material 12, preferably by drilling techniques. However, the holes may alternatively be defined within the parent material via any conventional techniques or machines (e.g., computer-aided fabrication, two-dimensional machines, water jet cutting, laser cutting, etc.). In this case, the two materials that construct the photonic crystal structure include air (or possibly vacuum for space applications) and parent material 12. The parent material is preferably an RF laminate and includes a high dielectric constant ($\in_r$; e.g., in the range of 10-12). The parent material may alternatively include plastics (e.g., a high density polyethylene, etc.), glass or other materials with a low loss tangent at the frequency range of interest and a suitable dielectric constant. The hole arrangement may be adjusted to alter the behavior of the prism layer as described below.

Parent material 12 may be of any suitable shape or size. By way of example only, parent material 12 is substantially cylindrical in the form of a disk with substantially planar front and rear surfaces. The holes are generally defined through the parent material in the direction of (or substantially parallel to) the propagation path of the beam (e.g., along a propagation axis, or from the prism front surface through the prism thickness toward the prism rear surface). Holes 14 within parent material 12 include dimensions less than that of the wavelength of the signal or beam of interest, while the spacing between these holes are similarly on the order of or less than the interested signal wavelength. For example, a hole dimension and spacing each less than one centimeter may be employed for an RF beam with a frequency of 30 gigahertz (GHz). A greater efficiency of the prism may be achieved by reducing the dimensions and spacing of the holes relative to the wavelength of the signal of interest as described below.

As a photon approaches material 12, an electromagnetic field proximate the material essentially experiences an averaging effect from the varying dielectric constants of the two materials (e.g., material 12 and air) and the resulting dielectric effects from those materials are proportional to the average of the volumetric capacities of the materials within the prism layer. In other words, the resulting dielectric effects are comparable to those of a dielectric with a constant derived from a weighted average of the material constants, where the material constants are weighted based on the percentage of the corresponding material volumetric capacity relative to the volume of the structure. For example, a structure including 60% by volume of a material with a dielectric constant of 11.0 and 40% by volume of a material with a dielectric constant 6.0 provides properties of a dielectric with a constant of 9.0 (e.g., (60%×11.0)+(40%×6.0)=6.6+2.4=9.0).

Since an optical prism may include portions of greater refractive material, the photonic crystal structure for prism layer 10 may be constructed to similarly include (or emulate) this property. By way of example only, holes 14 may be defined within a portion of the prism layer to be spaced significantly closer together than holes defined within other prism layer portions, where the dielectric constant of the prism layer, $\in_r$, increases from the portion with closely spaced holes to the portion with further spaced holes (e.g., as viewed in FIG. 3). Since the index of refraction of the prism layer is proportional to the dielectric constant, the index of refraction similarly follows this trend. The spacing of holes 14 and their corresponding diameters may be adjusted as a function of the structure diameter to create a prism effect from the entire structure. Thus, the electromagnetic fields produced by the photonic crystal structure essentially emulate the effects of an optical prism and enable the entire RF beam to be steered or refracted. Since the photonic crystal structure is generally planar or flat, the photonic crystal structure is simple to manufacture and may be realized through the use of computer-aided fabrication techniques as described above.

The manner in which holes 14 are defined in prism layer 10 is based on the desired steering or refraction of the RF beam. An exemplary optical wedge prism 25 that steers or refracts a beam is illustrated in FIGS. 4A-4B and 5-6. Initially, prism 25 is substantially circular and includes a generally triangular (or wedge shaped) transverse cross-section (FIG. 4A) providing a wedge angle (e.g., varying prism thicknesses along a vertical optical axis 80, where the wedge angle is defined by the wedge or prism narrow portion) for purposes of describing the steering effect. The various prism thicknesses enable the wedge angle to vary at successive angular prism locations relative to the prism optical axis (e.g., the wedge angle varies at prism rotations of 0°, 10°, 20°, 30° and 45° relative to the optical axis as viewed in FIG. 6). A cross-section of prism 25 includes a base and a truncated vertex disposed opposite the base (FIG. 5) with exterior prism faces oriented at the wedge angle and not perpendicular to an axis of rotation 60 of the prism (e.g., the axis about which the prism is rotated, typically the axis extending through the centerpoints of the prism faces).

Specifically, a beam 7 is directed to traverse prism 25. The propagation of the beam exiting the prism may be determined from Snell's Law as follows.

$$n_1 \sin \theta_1 = n_2 \sin \theta_2 \quad \text{(Equation 1)}$$

where $n_1$ is the index of refraction of the first material traversed by the beam, $n_2$ is the index of refraction of the second material traversed by the beam, $\theta_1$ is the angle of the beam entering into the second material, and $\theta_2$ is the angle of the refracted beam within that material. The steering angles of interest for beam 7 directed toward prism 25 are determined relative to rotation axis 60 (e.g., an axis perpendicular to and extending through the centerpoints of the prism front and rear faces) and in accordance with Snell's Law. Thus, each of the equations based on Snell's Law (e.g., as viewed in FIG. 4B) has the equation angles adjusted by the wedge angle (e.g., β as viewed in FIG. 4B) to attain the beam steering value relative to the rotation axis as described below.

Beam 7 enters prism 25 at an angle, $\theta_{1A}$, that is within a plane containing optical axis 80 for the prism (e.g., the vertical line or axis through the center of the prism point from the thinnest part to the thickest part) and rotation axis 60. This angle is the angle of the beam 23 entry, α, relative to rotation axis 60 and adjusted by the wedge angle, β (e.g., $\theta_{1A} = \alpha - \beta$). The beam is refracted at an angle, $\theta_{2A}$, relative to surface normal 70 of the prism front surface and determined based on Snell's Law as follows.

$$\theta_{2A} = \left(\sin^{-1}\left(\frac{n_{air}}{n_M}\sin(\theta_{1A})\right)\right) \quad \text{(Equation 2)}$$

where $n_{air}$ is the index of refraction of air, $n_M$ is the index of refraction of the prism material and $\theta_{1A}$ is the angle of beam entry.

The beam traverses the prism and is directed toward the prism rear surface at an angle, $\theta_{1B}$, relative to surface normal 70 of that rear surface. This angle is the angle of refraction by the prism front surface, $\theta_{2A}$, combined with wedge angles, $\beta$, from the front and rear prism surfaces and may be expressed as follows.

$$\theta_{1B} = \theta_{2A} + 2\beta \quad \text{(Equation 3)}$$

The beam traverses the prism rear surface and is refracted at an angle, $\theta_{2B}$, relative to surface normal 70 of the prism rear surface and determined based on Snell's Law as follows.

$$\theta_{2B} = \left(\sin^{-1}\left(\frac{n_M}{n_{air}}\sin(\theta_{1B})\right)\right) \quad \text{(Equation 4)}$$

where $n_M$ is the index of refraction of the prism material, $n_{air}$ is the index of refraction of air, and $\theta_{1B}$ is the angle of beam entry. The angle of refraction, $\theta_R$, relative to rotation axis 60 is simply the refracted angle relative to surface normal 70 of the prism rear surface, $\theta_{2B}$, less the wedge angle, $\beta$, of the prism rear surface (e.g., as viewed in FIG. 4B) and may be expressed as follows.

$$\theta_R = \theta_{2B} - \beta = \quad \text{(Equation 5)}$$
$$\sin^{-1}\left(\frac{n_M}{n_{air}}\sin\left(\sin^{-1}\left(\frac{n_{air}}{n_M}\sin(\alpha - \beta)\right) + 2\beta\right)\right) - \beta$$

Additional terms are needed in order to extend the formula to a second sequential prism. In particular, Snell's law is applied to the additional prism via a projection technique that decomposes RF beam 7 refracted by the first prism into X and Y components with respect to an optical axis of the second prism. The X component of the RF beam is derived from the RF beam exiting the first prism. This beam component exits the first prism at a given angle, $\rho$, which may be determined by setting angle $\alpha$ to zero in Equation 5 as follows.

$$\rho = \sin^{-1}\left(\frac{n_M}{n_{air}}\sin\left(\sin^{-1}\left(\frac{n_{air}}{n_M}\sin(-\beta)\right) + 2\beta\right)\right) - \beta \quad \text{(Equation 6)}$$

where $n_M$ is the index of refraction of the prism material, $n_{air}$ is the index of refraction of air, and $\beta$ is the wedge angle.

The optical axis of the second prism may be angularly offset from the optical axis of the first prism. In this case, the RF beam from the first prism needs to be decomposed into the X and Y components. The X component of the angle of incidence of the RF beam on the second prism creates an effect on the wedge angle. Basically, the angle of incidence makes the wedge angle of the second prism appear larger (FIG. 6), thereby causing greater steering effects on the RF beam in the second prism.

In order to account for the angle of incidence of the RF beam into the second prism, and the effective increase in the wedge angle, a new wedge angle, $\beta_y$, is derived from the expansion of the wedge angle along the X-axis of the angle of incidence and may be expressed as follows.

$$\beta_y = \tan^{-1}\left(\frac{\tan\beta}{\cos(\rho\sin(\gamma))}\right) \quad \text{(Equation 7)}$$

where $\beta$ is the wedge angle, $\rho$ is the X component of the RF beam exiting the first prism and $\gamma$ is the angular offset between the optical axes of the first and second prisms. The new effective wedge angle increases the amount the prism steers the beam.

The Y component of the resulting RF beam (e.g., along the Y-axis or axis parallel to the optical axis of the second prism) steered by the second prism may be determined from Snell's Law and expressed as follows.

$$\theta_y = \sin^{-1}\left(\frac{n_M}{n_{air}}\sin\left(\sin^{-1}\left(\frac{n_{air}}{n_M}\sin(\rho\cos(\gamma) - 2\beta_y)\right) + 2\beta_y\right)\right) - \beta_y \quad \text{(Equation 8)}$$

where $n_M$ is the index of refraction of the material of the prism, $n_{air}$ is the index of refraction of air, $\beta_y$ is the newly derived wedge angle, $\rho$ is the X component of the RF beam exiting the first prism and $\gamma$ is the angular offset between the optical axes of the first and second prisms.

Since the X component of the RF beam along the X-axis (e.g., the transverse axis perpendicular to the optical axis of the second prism) effectively does not see the wedge (e.g., analogous to a slice perpendicular to the vertical optical axis which provides the same thickness or wedge angle), the X component of the resulting angle for the steered RF beam is basically unaltered. Thus, the resulting X component of the steering angle, $\theta_X$, is produced by the first prism and may be expressed as follows.

$$\theta_x = \rho\sin(\gamma) \quad \text{(Equation 9)}$$

where $\rho$ is the angle of the X component of the RF beam exiting the first prism and $\gamma$ is the angular offset between the optical axes of the first and second prisms.

The magnitude of the resulting steering angle, $\theta_S$, is given by the root sum square (RSS) of $\theta_X$ and $\theta_Y$ and may be expressed as follows.

$$\theta_S = \sqrt{\theta_x^2 + \theta_y^2} \quad \text{(Equation 10)}$$

Generally, an arbitrary alignment between the optical axis of the second prism and the field of regard (FoR) is employed in an implementation. The above formulas may be further extended by applying one more coordinate transformations (e.g., a rotation about the Z-axis or axis parallel with the axis of rotation), where the most general form for steering the RF beam is obtained and any point within the entire FoR may be achieved. This may be expressed within polar coordinates in field space as follows.

$$\phi = \tan^{-1}\left(\frac{\theta_y}{\theta_x}\right) + \phi_0 \quad \text{(Equation 11)}$$

where φ represents the rotational component of the steering, φ₀ represents the rotation between the optical axis of the second prism and the Field of Regard coordinate system, $\theta_X$ represents the X component of the steering angle for the RF beam and $\theta_Y$ represents the Y component of the steering angle for the RF beam.

Figure 5:
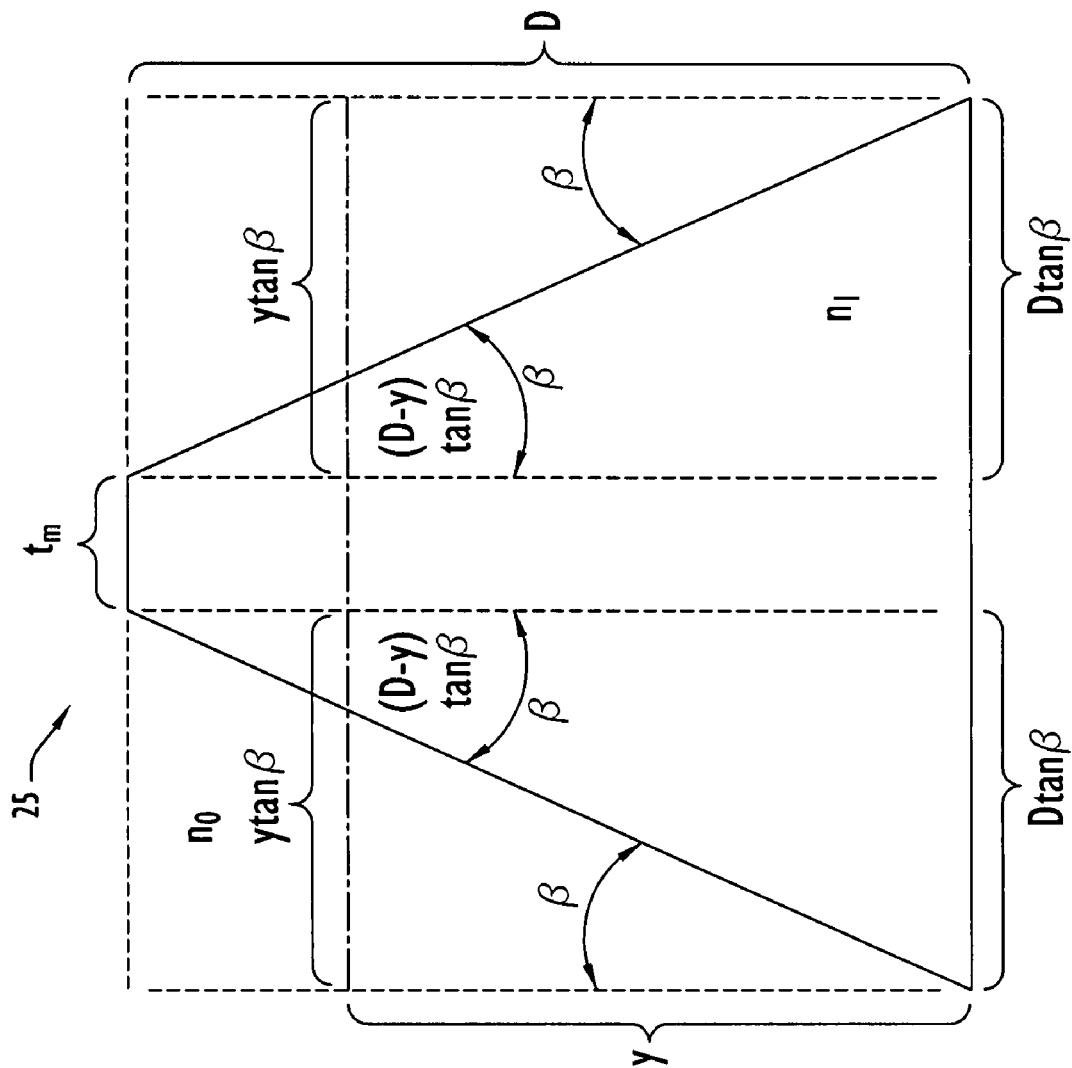
FIG. 5 is a view in elevation and section of the exemplary wedge prism illustrated in an inverted position with respect to FIG. 4A.
Figure 6:
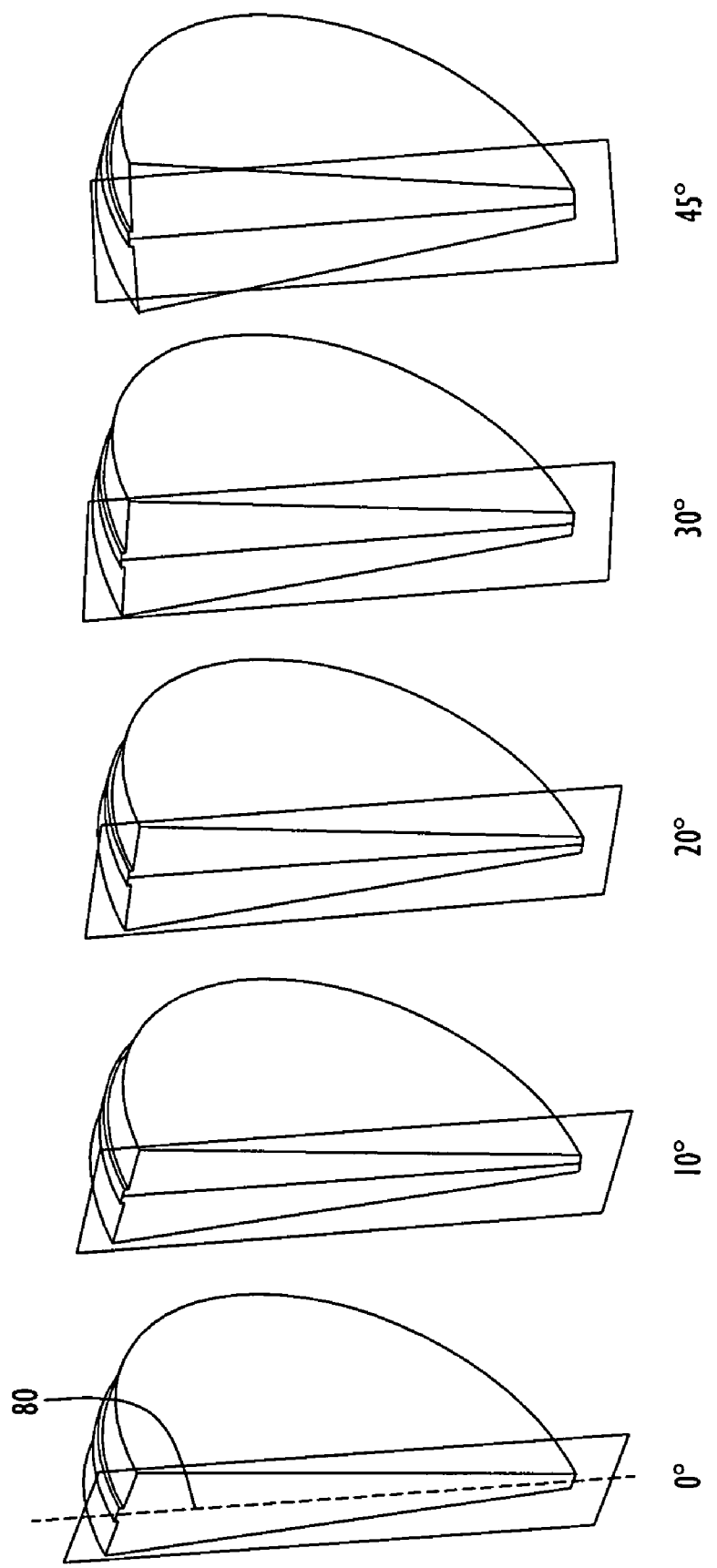
FIG. 6 are views in partial section of the exemplary wedge prism of FIG. 4A illustrating a varying wedge angle.

Referring to FIG. 5, exemplary optical wedge prism 25 (e.g., inverted with respect to FIGS. 4A and 6) is symmetric about a plane perpendicular to prism rotation axis 60. Prism 25 typically includes a nominal thickness, $t_m$, at the portion proximate the truncated vertex. The prism includes an index of refraction, $n_1$, while the surrounding media (e.g., air) includes an index of refraction, $n_0$, typically approximated to 1.00. An average index of refraction for prism 25 may be determined for a prism portion or line (e.g., along the dashed-dotted line as viewed in FIG. 5) as a function of the distance, y, of that line from the base edge of prism 25 as follows (e.g., a weighted average of index of refraction values for line segments along the line based on line segment length).

$$\bar{n}(y) = \frac{2n_1(D-y)\tan\beta + 2n_0 y\tan\beta}{2D\tan\beta} \quad \text{(Equation 12)}$$

where $n_1$ is the index of refraction of prism 25, $n_0$ is the index of refraction of air, D is the diameter or longitudinal dimension of prism 25, y is the distance from the prism edge and β is the wedge angle of prism 25. The nominal thickness, $t_m$, of prism 25 does not contribute to the average index of refraction since the prism index of refraction remains relatively constant in the areas encompassed by the nominal thickness (e.g., between the vertical dotted lines as viewed in FIG. 5).

The linear change in the average index of refraction of prism 25 as a function of the distance, y, determines the steering angle of prism 25 as follows.

$$\frac{d\bar{n}}{dy} = \frac{2n_0\tan\beta - 2n_1 D\tan\beta}{2D\tan\beta} = \left(\frac{n_0 - n_1 D}{D}\right)\tan\beta \quad \text{(Equation 13)}$$

where $n_1$ is the index of refraction of prism 25, $n_0$ is the index of refraction of air, D is the diameter or longitudinal dimension of prism 25 and β is the wedge angle of prism 25. Therefore, a photonic crystal prism with a constant average index of refraction variation, $D\bar{n}/dy$, provides the same beam steering characteristics as wedge prism 25 with a wedge angle, β, expressed as follows.

$$\beta = \arctan\left(\frac{d\bar{n}}{dy} \cdot \frac{D}{n_0 - n_1 D}\right) \quad \text{(Equation 14)}$$

where $n_1$ is the index of refraction of prism 25, $n_0$ is the index of refraction of air and D is the diameter or longitudinal dimension of prism 25.

In order to create a photonic crystal prism that emulates the physical properties of prism 25, a series of holes are arranged within a parent material in substantially the same manner described above to create the desired average index of refraction profile described above. However, the index of refraction for a photonic crystal prism is equivalent to the square-root of the prism dielectric constant (e.g., for materials that exhibit low loss tangents which are preferred for prism steering of RF beams). In the case of materials including significant absorption or scatter, the index of refraction is a complex value with real and imaginary components. The imaginary component provides a measure of loss. Since the magnitude of the imaginary component (or loss) detracts from the real component (or dielectric constant), the dielectric constant differs from the above relationship in response to significant losses. The effective index of refraction along a portion or line of the photonic crystal prism is obtained by taking the average volumetric index of refraction along that line (e.g., a weighted average of the index of refraction (or dielectric constants of the materials and holes) along the line based on volume in a manner similar to that described above). The steering angle, $\theta_S$ or φ, of the resulting photonic crystal prism may be determined based on Snell's Law by utilizing the effective index of refraction of the photonic crystal prism as the material index of refraction, $n_M$, within the analysis described above. The volumetric average determination should consider the regions above and below the line (e.g., analogous to distance value, y, described above). The physical shape of the holes may vary depending on the manufacturing process. One exemplary manufacturing process includes drilling holes in the prism materials.

The orientation of the holes defined in the photonic crystal prism may be normal to the front and back prism faces (e.g., in a direction of the rotation axis). The dimensions of the holes are sufficiently small to enable the electromagnetic fields of photons (e.g., manipulated by the photonic crystal structure) to be influenced by the average index of refraction over the prism volume interacting with or manipulating the photons. Generally, the diameter of the holes does not exceed (e.g., less than or equal to) one-quarter of the wavelength of the beam of interest, while the spacing between the holes does not exceed (e.g., less than or equal to) the wavelength of that beam.

Accordingly, an interaction volume for the photonic crystal prism includes one square wave (e.g., an area defined by the square of the beam wavelength) as viewed normal to the propagation axis. Since changes in the photonic crystal structure may create an impedance mismatch along the propagation axis, the interaction length or thickness of the photonic crystal prism includes a short dimension. Generally, this dimension of the photonic crystal prism along the propagation axis (e.g., or thickness) should not exceed 1/16 of the beam wavelength in order to avoid impacting the propagation excessively (e.g., by producing back reflections or etalon resonances). Thus, drilling holes through the thickness of the material is beneficial since this technique ensures minimal change to the index of refraction along the propagation axis.

By way of example, a spacing of holes within the parent material that provides a minimum average index of refraction (e.g., defined by the largest hole diameter allowed and determined by the wavelength of operation as described above) includes the holes spaced apart from each other in a hexagonal arrangement of equatorial triangles (e.g., each hole at a corresponding vertex of a triangle) with a minimum wall thickness between holes to provide adequate mechanical strength. This is a spacing of holes that coincides with the thinnest part of a conventional prism (e.g., y=D in Equation 12).

Conversely, a spacing of holes within the parent material that may provide the greatest average index of refraction is a photonic crystal prism without the presence of holes. However, the need for a smoothly changing average index of refraction and efficient control of the direction of the beam energy may put limitations on this configuration. If the photonic crystal prism is configured to include holes of the same size (e.g., as may be economically feasible due to manufacturing limitations on machines, such as automated drilling centers), the maximum average index of refraction would be obtained with a minimum of one hole per interaction volume. This region of the photonic crystal prism corresponds to the thickest part of prism 25 (e.g., y=0 in Equation 12).

The desired prism characteristics (or steering angles, $\theta_R$ and $\theta_S$, for the first and second prisms) may be selected, where the prism wedge angles, $\beta$, providing these characteristics may be determined from the above equations (e.g., Equations 1-11). Once the wedge angle is determined, the photonic crystal prisms may be configured with a series of holes in accordance with the index of refraction profiles (e.g., determined from the change and average index of refraction values from Equations 13-14) providing the desired characteristics of prisms with those wedge angles. The wedge angle, $\beta$, for first and second prisms 20, 21 may be the same or different angle depending upon the characteristics desired.

Thus, based on a desired steering angle, $\theta_S$ or $\phi$, for the beam, controller 40 (FIG. 1) may utilize the above equations (e.g., Equations 6-11 with the known properties of the prisms (e.g., index of refractions of the material and air, wedge angle, etc.)) to determine the angular offset, $\gamma$, needed between the first and second photonic crystal prisms, and subsequently control motors 30 to position the prisms in an appropriate fashion to steer the beam in a desired manner.

The photonic crystal structure of prisms 20, 21 may be produced by various other manufacturing processes. For example, prisms 20, 21 may be produced utilizing stereolithography machines. In this case, the size, shape and spacing of holes 14 may be more elaborately defined to enable closer approximations to the needed average index of refraction profile. Further, the shape and size of holes 14 may vary (e.g., non-circular shape and non-uniform hole dimensions). By way of example, the average index of refraction may be varied by selecting a spacing of holes and adjusting the hole diameters as a function of the distance from the prism edge. Moreover, stereolithography machines ease the task of creating layered structures that take into account the variation in the index of refraction along the direction of propagation.

Referring back to FIG. 2, the use of a parent material with a high dielectric constant value for prism layer 10 results in a lighter prism, but tends to produce the prism without the property of being impedance matched. The lack of impedance matching creates surface reflections and ultimately requires more power to operate an RF system. Accordingly, prisms 20, 21 include impedance matching layers 22 applied to photonic crystal prism layer 10 to minimize these reflections. The ideal dielectric constant of impedance matching layers 22 is the square-root of the dielectric constant of prism layer 10. However, due to the variable hole spacing in the prism layer as described above, the dielectric constant for the prism layer is variable.

In order to compensate for the variable dielectric constant of the prism layer, impedance matching layers 22 similarly include a photonic crystal structure. This structure may be constructed in the manner described above for the prism layer and includes a parent material 32 with an average dielectric constant approximating the square-root of the average dielectric constant of parent material 12 used for prism layer 10. The parent material may be of any shape or size and may be of any suitable materials including the desired dielectric constant properties. By way of example only, parent material 32 is substantially cylindrical in the form of a disk with substantially planar front and rear surfaces.

Impedance matching layers 22 typically include a hole-spacing pattern similar to that for prism layer 10, but with minor variations to assure a correct square-root relationship between the local average dielectric constant of the prism layer and the corresponding local average dielectric constant of the impedance matching layers. In other words, the hole-spacing pattern is arranged to provide an average index of refraction (e.g., Equation 12) (or dielectric constant) profile equivalent to the square root of the average index of refraction (or dielectric constant) profile of the layer (e.g., prism layer 10) being impedance matched. In particular, the impedance matching layer thickness is in integer increments of (2n−1) $\lambda/4$ waves or wavelength (e.g., ¼ wave, ¾ wave, 5/4 wave, etc.) and is proportional to the square-root of the index of refraction of the prism layer being impedance matched as follows.

$$t\sqrt{\bar{n}(y)} = (2n-1)\lambda/4 \qquad \text{(Equation 15)}$$

where t is the impedance layer thickness, $\lambda$ is the wavelength of the beam of interest, n represents a series instance and $\bar{n}(y)$ is the average index of refraction of the prism layer as function of the distance, y, from the prism edge.

Achieving a lower index of refraction with an impedance matching layer may become infeasible due to the quantity of holes required in the material. Accordingly, systems requiring impedance matching layers should start with an analysis of the minimum average index of refraction that is likely to be needed for mechanical integrity, thereby providing the index of refraction required for the impedance matching layer. The average index of refraction of the device to which this impedance matching layer is mated would consequently be the square of the value achieved for the impedance matching layer.

An ideal thickness for the impedance matching layers is one quarter of the wavelength of the signal of interest divided by the square-root of the (average) index of refraction of the impedance matching layer (e.g., Equation 15, where the index of refraction is the square root of the dielectric constant as described above). Due to the variability of the dielectric constant of the impedance matching layer, a secondary machining operation may be utilized to apply curvature to the impedance matching layers and maintain one quarter wave thickness from the layer center to the layer edge. The impedance matching layers may enhance efficiency on the order of 20%.

A typical illumination pattern on a dish antenna is a truncated exponential field strength, or a truncated Gaussian. The Gaussian is truncated at the edge of the dish antenna since the field must get cut-off at some point. At the edge of the dish antenna, the field strength must go to zero, yet for a typical feed horn arrangement, the field strength at the edge of the dish antenna is greater than zero. This creates a problem in the far field, where the discontinuous derivative of the aperture illumination function creates unnecessarily strong side-lobes. Side-lobes are the portion of an RF beam that are dictated by diffraction as being necessary to propagate the beam from the aperture of the antenna. In the far field, the main beam follows a beam divergence that is on the order of twice the beam wavelength divided by the aperture diameter. The actual intensity pattern over the entire far field, however, is accurately approximated as the Fourier transform of the aperture illumination function.

Sharp edges in the aperture illumination function or any low-order derivatives create spatial frequencies in the far field. These spatial frequencies are realized as lower-power beams emanating from the RF antenna, and are called side-lobes. Side-lobes contribute to the detectability of an RF beam, and make the beam easier to jam or eavesdrop. In order to reduce the occurrence of these types of adverse activities, the side-lobes need to be reduced. One common technique to reduce side-lobes is to create an aperture illumination function that is continuous, where all of the function derivatives are also continuous. An example of such an illumination function is a sine-squared function. The center of the aperture includes an arbitrary intensity of unity, while the intensity attenuates following a sine-squared function of the aperture radius toward the outer aperture edge, where the intensity equals zero.

The sine-squared function is a simple function that clearly has continuous derivatives. However, other functions can be used, and may offer other advantages. In any event, the illumination function should be chosen to include some level of absorption of the characteristic feed horn illumination pattern (e.g., otherwise, gain would be required).

In order to reduce side-lobes, prism 20 may further include apodizing mask 24 that is truly absorptive for an ideal case. The apodizing mask is preferably constructed to include a photonic crystal structure (FIG. 2) similar to the photonic crystal structures described above for the prism and impedance matching layers. In particular, holes 14 may be defined within a parent material 42 with an appropriate absorption coefficient via any suitable techniques (e.g., drilling, etc.). The holes are arranged or defined within the parent material to provide the precise absorption profile desired. The parent material may be of any shape or size and may be of any suitable materials including the desired absorbing properties. By way of example only, parent material 42 is substantially cylindrical in the form of a disk with substantially planar front and rear surfaces.

Material absorption is analyzed to provide the needed absorption profile as a function of beam radius (as opposed to the index of refraction). Holes 14 are placed in parent absorber material 42 to create an average absorption over a volume in substantially the same manner described above for achieving the average index of refraction profile for the prism layer. The actual function of the apodization profile may be quite complex if a precise beam shape is required. However, a simple formula applied at the edge of the aperture is sufficient to achieve a notable benefit.

An example of an apodizing function that may approximate a desired edge illumination taper for controlling side-lobes is one that includes $1/r^2$ function, where r represents the radius of the beam or aperture. For example, a prism with an incident aperture illumination function that is Gaussian in profile and an edge intensity of 20% (of the peak intensity at the center) may be associated with an edge taper function, $\psi(r)$, as follows.

$$\psi(r) = \left(\frac{1}{3(1-r)}\right)^2 + 1 \quad \text{(Equation 16)}$$

The denominator multiplier term (e.g., three) is a consequence of the illumination function including 20% energy at the edge of the aperture. This multiplier may vary according to the energy value at the edge of the aperture. Equation 16 provides the absorption ratio as a function of radius, which can be summarized as the ratio of the absorbed energy over the transmitted energy. The value for the radius is normalized (e.g., radius of $r_{max}=1$) for simplicity. This function closely approximates the ideal apodization function. However, minor variations to the function may be desired for an optimized system.

In order to realize this function within photonic crystal apodizing mask 24, a series of holes 14 are placed within parent material 42 that is highly absorptive to radio waves (e.g., carbon loaded material, etc.). The average absorption of the material (e.g., a weighted average of the absorption of the material and holes (e.g., the holes should have no absorption) based on volume and determined in a manner similar to the weighted average for the dielectric constant described above) over the interaction volume of the prism provides the value of the absorption for the apodizing mask. The mask absorption divided by the unapodized case should yield an approximate value resulting from Equation 16. Thus, holes 14 are placed in parent material 42 in a manner to provide the absorption values to produce the desired absorption profile. Apodizing mask 24 may be configured with holes 14 closely spaced together when this layer is mounted to other layers of the prism. In this case, the mechanical integrity for the apodizing mask is provided by the layers to which the apodizing mask is mounted, thereby enabling the closely spaced arrangement of holes 14.

The apodizing mask is simple to manufacture through the use of computer-aided fabrication techniques as described above. Equation 16 may be modified to accommodate feeds that do not produce energy distributions with a Gaussian profile and achieve the desired results.

Prisms 20, 21 may be utilized to create virtually any type of desired beam pattern. The photonic crystal structure may be configured to create any types of devices (e.g., quasi-optical, lenses, prisms, beam splitters, filters, polarizers, etc.) in substantially the same manner described above by simply adjusting the hole dimensions, geometries and/or arrangements within a parent dielectric material to attain the desired beam steering and/or beam forming characteristics. For example, a prism may be configured to include both lens and prism properties, where holes may be defined in the dielectric material to provide both lens and prism properties. Beam steering device 50 may alternatively employ this type of photonic crystal structure including lens and prism properties in place of prism 21 to steer and focus the RF beam. Thus, several photonic crystal structures may be produced each with a different hole pattern (e.g., including properties of prisms, lenses and/or other devices) to provide a series of interchangeable structures (e.g., prisms or other devices) for an RF beam steering system (FIG. 1). In this case, a photonic crystal prism may easily be replaced within the beam steering device with other photonic crystal structures (e.g., with lens, prism and/or other desired properties) including different hole patterns to attain desired (and different) beam patterns and/or steering.

The present invention embodiments may be utilized in varying applications. For example, the present invention embodiments may be utilized for moderate levels of radio beam deflection (e.g., such as that offered by a pan-tilt positioner) when the combined antenna/prism assembly is mounted on a conventional (e.g., azimuth-only) rotator (e.g., such as a Yaesu G-1000DXA or similar unit). Further, the present invention embodiments may be utilized for moderate levels of radio beam deflection in systems that are impractical to implement using traditional phased-array or gimbal steering techniques. Moreover, the present invention embodiments may be applied for spatial separation of radio beams, each at different frequencies, to an array of frequency-specific generators or detectors.

In addition, the present invention embodiments may be advantageous for mast-mounted scenarios (e.g., a mast on a motorized or other vehicle (e.g., ground vehicle, etc.)) since the photonic crystal prisms provide greatly reduced mechanical coupling. For example, the mechanical coupling within conventional azimuth/elevation compensation systems tends to cause added sway in mast-mounted scenarios that may become a run-away problem. The photonic crystal prisms of the present invention embodiments employ greatly reduced coupling and may be advantageous in mobile applications including swaying antenna masts that would otherwise be too problematic for conventional systems, especially for higher frequency antennas that include greater directionality.

Even with the greatly reduced coupling of embodiments of the present invention, undesirable swaying in certain configurations, e.g., mast-mounted configurations, may still occur. That is, both prisms 20, 21 may undesirably move together along with a platform to which the prisms are mounted. To address any mis-steering as a consequence of such motion, sensors 29 (FIG. 1) may also include accelerometer (or tilt) sensors mounted in the vicinity of prisms 20, 21. Such sensors may be used to compensate for any instability in the platform to which the beam steering device 50 is mounted and thereby provide a more stabilized RF beam.

More specifically, a sensor 29 associated with prism 20 may be designated, mounted and/or configured to sense left/right (or roll) motion of the platform, and a sensor 29 associated with prism 21 may be assigned, mounted and/or configured to sense forward/backward (or pitch) motion of the platform. In such a configuration, the two accelerometers need only be single-axis sensors. However, those skilled in the art will appreciate that multi-axis accelerometers are readily available in the market (e.g., from Analog Devices, Norwood, Mass.) and thus the described two single-axis accelerometer embodiment may, alternatively, be replaced with a single two-axis sensor embodiment. Alternatively, a plurality of multi-axis sensors may be employed for purposes of redundancy and/or compensation. As shown in FIG. 1, sensors 29 may be mounted directly on motors 30, or may be mounted spaced from motors 30. Yaw may also be monitored. Ultimately, specific design considerations, cost, and other factors will dictate whether single or multi-axis accelerometers (and how many) are to be implemented and precisely where such sensors should be located.

Figure 7:
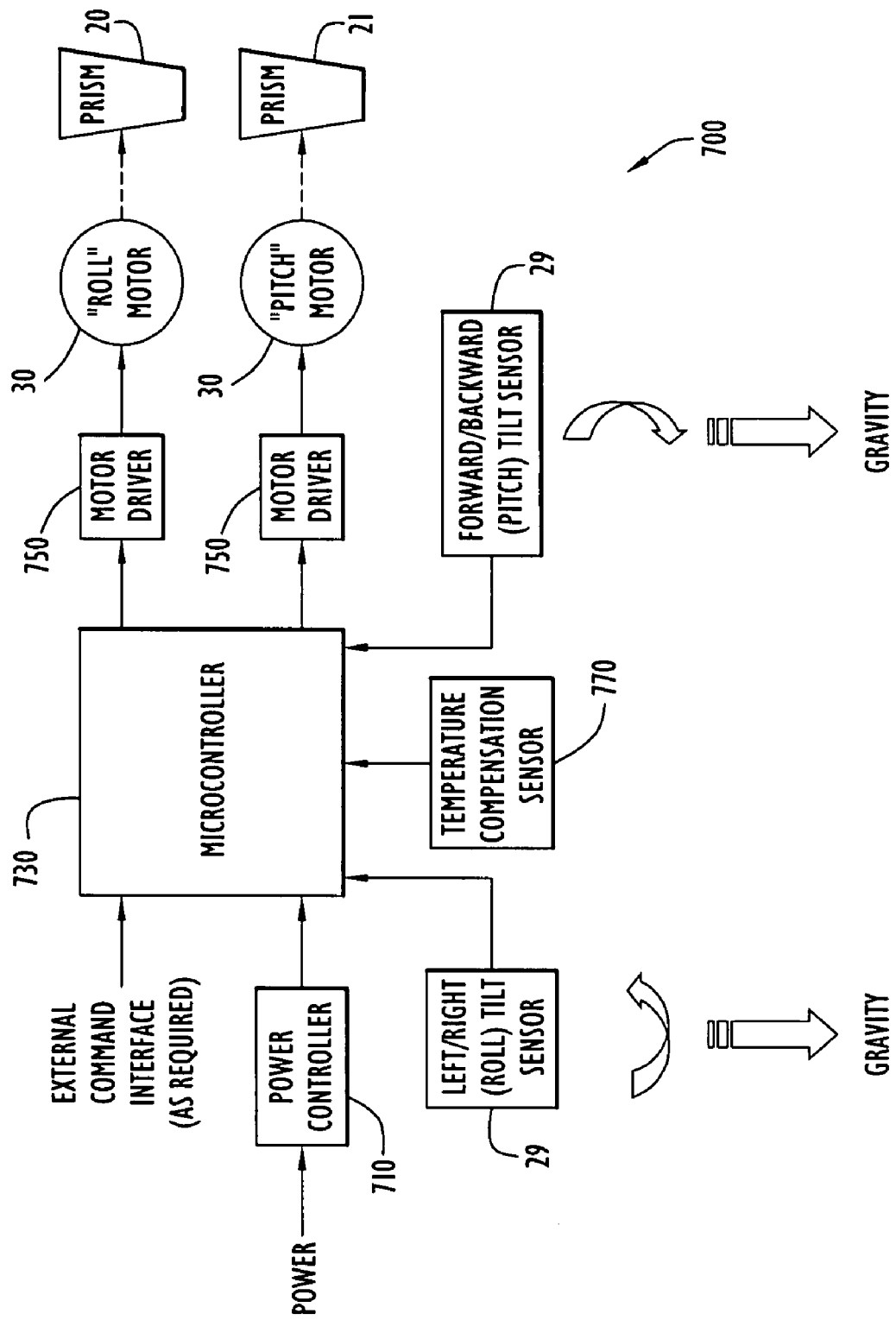
FIG. 7 is a block diagram of an exemplary circuit for stabilizing prisms in accordance with an embodiment of the present invention.

FIG. 7 depicts a block diagram of an exemplary circuit 700 (parts of which may be embodied in controller 40 of FIG. 1) in accordance with an embodiment of the present invention. As shown, a microcontroller 730 is powered through a power converter 710, as necessary, and is configured to send commands to motor drivers 750 that respectively drive motors 30 to adjust the orientation of prisms 20, 21. An external command interface may also be provided to, e.g., provide access to microcontroller to reprogram or debug the same.

As further shown in FIG. 7, signals (e.g., analog voltage signals or digital signals) from accelerometer sensors 29 are provided or transmitted (e.g., wirelessly) to microcontroller 730. The signals are representative of acceleration forces detected by the sensors. Microcontroller 730 then processes the received signals and translates the same into appropriate commands to motor drivers 750, which, in turn, drive motors 30 to rotate prisms 20, 21 in an appropriate direction to compensate for, e.g., sway that has been detected by the sensors.

A temperature compensation sensor 770 may also be provided to monitor ambient temperature and provide information to microcontroller 730 sufficient to account for changes, e.g., drift, in the signals received from sensors 29.

Figure 8:
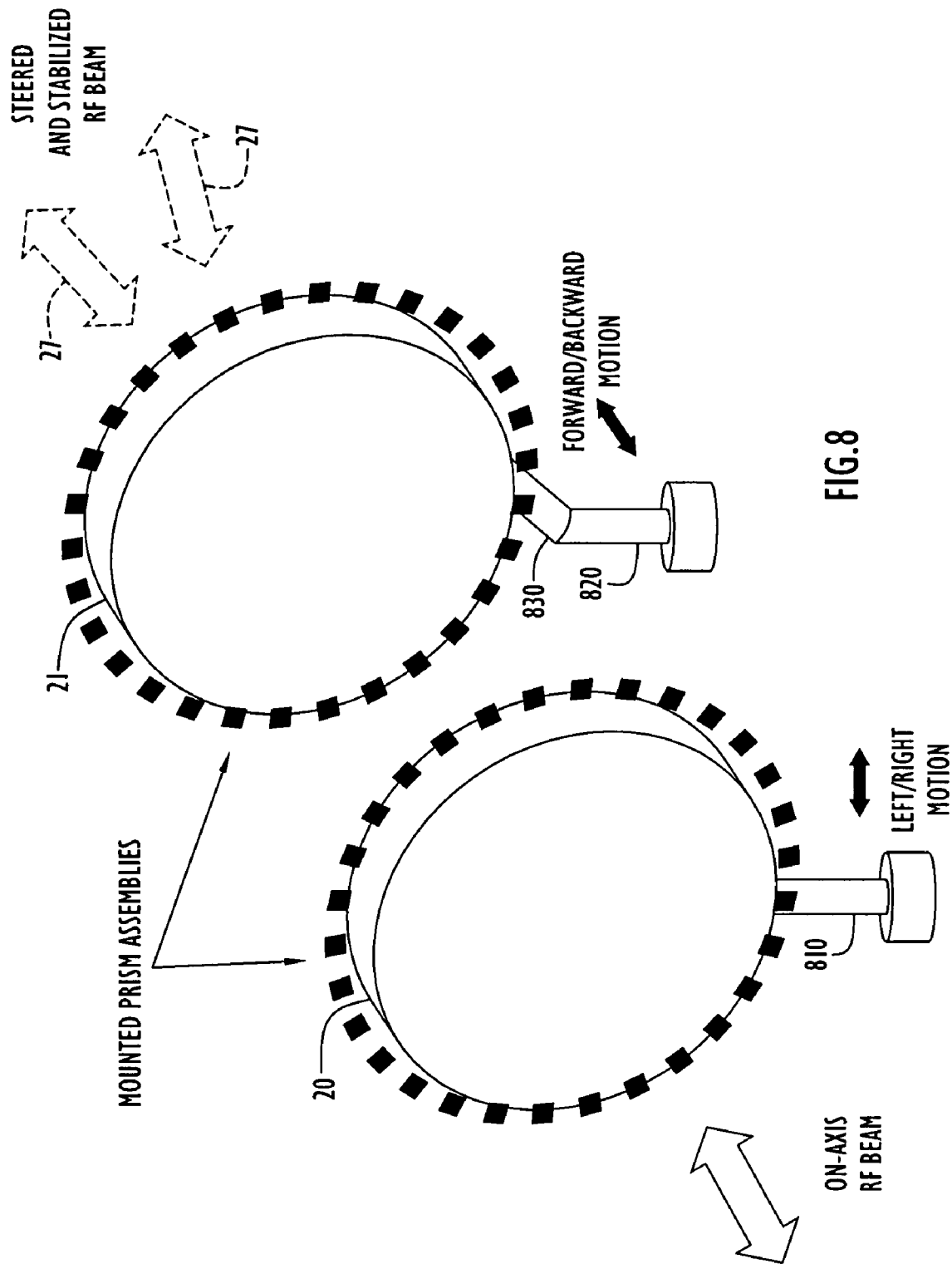
FIG. 8 is a schematic diagram of an exemplary mechanical stabilization mechanism in accordance with an embodiment of the present invention.

FIG. 8 illustrates a more mechanical approach to compensation for, e.g., swaying, or for other stabilization needs. In this embodiment, instead of using tilt or accelerometer sensors, counterweights 810, 820 are provided. Such counterweights may be in the form of a pendulum, but any shape that provides sufficient weight and suitable reaction time may be employed. In the case of left/right motion, counterweight 810 may be directly (or indirectly) coupled to prism 20 such that any swaying will be dampened by the counterweight. In the case of forward/backward motion, counterweight 820 may be coupled to prism 21 via a right-angle gear drive mechanism 830, since forward/backward motion occurs in a plane that is perpendicular to a plane in which prism 21 rotates. In this embodiment, it may be desirable to have a clutch mechanism (not shown) for motors 30 such that after prisms 20, 21 are rotated to desired positions, the motors are disengaged and the mechanical compensation technique is thereafter permitted to control the orientation of the prisms. Counterweights 810, 820 could also be used as part of an electromechanical tilt device, signals from which could be passed to microcontroller 730.

In sum, it may be desirable to include a compensation or stabilization device or technique to the beam steering methodologies and devices described herein to compensate for movement, such as mast swaying, and, in effect, stabilize, or further steer the RF beam 7.

It will be appreciated that the embodiments described above and illustrated in the drawings represent only a few of the many ways of implementing a method and apparatus for steering radio frequency beams utilizing photonic crystal structures.

The prisms may each include any quantity of layers arranged in any suitable fashion. The layers may be of any shape, size or thickness and may include any suitable materials. The prisms may be utilized for signals in any desired frequency range. The prism layer may be of any quantity, size or shape, and may be constructed of any suitable materials. Any suitable materials of any quantity may be utilized to provide the varying dielectric constants (e.g., a plurality of solid materials, solid materials in combination with air or other fluid, etc.). The prism layer may be utilized with or without an impedance matching layer and/or apodizing mask. The prism layer parent and/or other materials may be of any quantity, size, shape or thickness, may be any suitable materials (e.g., plastics (e.g., a high density polyethylene, etc.), RF laminate, glass, etc.) and may include any suitable dielectric constant for an application. The parent material preferably includes a low loss tangent at the frequency range of interest. The prism layer may be configured (or include several layers that are configured) to provide any desired steering effect or angle of refraction or to emulate any properties of a corresponding material or optical prism, lens and/or other beam manipulating device. The prism layer may further be configured to include any combination of beam forming (e.g., lens) and/or beam steering (e.g., prism) characteristics.

The holes for the prism layer may be of any quantity, size or shape, and may be defined in the parent and/or other material in any arrangement, orientation or location to provide the desired characteristics (e.g., beam steering effect, index of refraction, dielectric constant, etc.). The various regions of the prism layer parent material may include any desired hole arrangement and may be defined at any suitable locations on that material to provide the desired characteristics. The holes may be defined within the parent and/or other material via any conventional or other manufacturing techniques or machines (e.g., computer-aided fabrication techniques, stereolithography, two-dimensional machines, water-jet cutting, laser cutting, etc.). Alternatively, the prism layer may include or utilize other solid materials or fluids to provide the varying dielectric constants.

The impedance matching layer may be of any quantity, size or shape, and may be constructed of any suitable materials. Any suitable materials of any quantity may be utilized to provide the varying dielectric constants (e.g., a plurality of solid materials, solid materials in combination with air or other fluid, etc.). The parent and/or other materials of the impedance matching layer may be of any quantity, size, shape or thickness, may be any suitable materials (e.g., plastics (e.g., a high density polyethylene, etc.), RF laminate, glass, etc.) and may include any suitable dielectric constant for an application. The parent material preferably includes a low loss tangent at the frequency range of interest. The impedance matching layer may be configured (or include several layers that are configured) to provide impedance matching for any desired layer of the prism.

The holes for the impedance matching layer may be of any quantity, size or shape, and may be defined in the parent and/or other material in any arrangement, orientation or location to provide the desired characteristics (e.g., impedance matching, index of refraction, dielectric constant, etc.). The holes may be defined within the parent and/or other material via any conventional or other manufacturing techniques or machines (e.g., computer-aided fabrication techniques, stereolithography, two-dimensional machines, waterjet cutting, laser cutting, etc.). Alternatively, the impedance matching layer may include or utilize other solid materials or fluids to provide the varying dielectric constants.

The apodizing mask may be of any quantity, size or shape, and may be constructed of any suitable materials. Any suitable materials of any quantity may be utilized to provide the desired absorption coefficient or absorption profile (e.g., a plurality of solid materials, solid materials in combination with air or other fluid, etc.). The parent and/or other material of the apodizing mask may be of any quantity, size, shape or thickness, may be any suitable materials (e.g., plastics (e.g., a high density polyethylene, etc.), RF laminate, carbon loaded material, etc.) and may include any suitable radio or other wave absorption characteristics for an application. The parent material is preferably implemented by a material highly absorptive to radio waves. The apodizing mask may be configured (or include several layers that are configured) to provide the desired absorption profile.

The holes for the apodizing mask may be of any quantity, size or shape, and may be defined in the parent and/or other material in any arrangement, orientation or location to provide the desired characteristics (e.g., side-lobe suppression, absorption, etc.). The holes may be defined within the parent and/or other material via any conventional or other manufacturing techniques or machines (e.g., computer-aided fabrication techniques, stereolithography, two-dimensional machines, water jet cutting, laser cutting, etc.). Alternatively, the apodizing mask may include or utilize other solid materials or fluids to provide the absorption properties. The apodizing mask may be configured to provide the desired absorbing properties for any suitable taper functions.

The layers of the prism (e.g., prism layer, impedance matching, apodizing mask, etc.) may be attached in any fashion via any conventional or other techniques (e.g., adhesives, etc.). The prism may be utilized in combination with any suitable signal source (e.g., feed horn, antenna, etc.), or signal receiver to steer incoming signals. The prism or other photonic crystal structure may be utilized to create virtually any type of desired beam pattern, where several prisms or structures may be produced each with a different hole pattern to provide a series of interchangeable structures to provide various beams for RF or other systems. Further, the photonic crystal structure may be utilized to create any beam manipulating device (e.g., prism, lens, beam splitters, filters, polarizers, etc.) by simply adjusting the hole dimensions, geometries and/or arrangement within the parent and/or other materials to attain the desired beam steering and/or beam forming characteristics.

The beam steering device may include any quantity of components (e.g., motors, rotating assemblies, controller, sensors, etc.) arranged in any desired fashion. The beam steering device may employ any quantity of prisms and/or other beam manipulating devices arranged and/or oriented in any desired fashion to steer any type of beam in any desired manner. The rotating assemblies may be of any quantity, shape or size and may be implemented by any conventional or other assemblies. The rotating assemblies may include any suitable rotating mechanism (e.g., rotating ring, platform or other suitable structure) to secure and rotate a beam manipulating device (e.g., prism, etc.) and may be disposed at any suitable locations. The rotating assemblies may manipulate the beam steering devices (e.g., prism, etc.) to any suitable orientations to steer the beam in a desired manner. The motors may be of any quantity, shape or size and may be implemented by any conventional or other motors or actuators to rotate the beam manipulating devices (e.g., prism, etc.).

The controller may be of any quantity and may be implemented by any conventional or other controller or processor (e.g., microprocessor, controller, control circuitry, logic, etc.). The sensors may be of any quantity and may be implemented by any conventional or other sensors (e.g., encoders, potentiometers, etc.) to measure the rotation of the beam manipulating devices (e.g., prism, etc.) and/or other system conditions. The sensors may be disposed at any suitable locations to measure the rotation (e.g., motors, rotating assemblies, etc.) of the beam manipulating devices (e.g., prism, etc.). The beam steering device may be employed with any suitable signal source (e.g., antenna, feed horn, etc.) or RF system to provide the desired beam steering, where the beam steering device may be positioned at any suitable location to receive and steer a beam.

It is to be understood that the terms "top", "bottom", "front", "rear", "side", "height", "length", "width", "upper", "lower", "thickness", "vertical", "horizontal" and the like are used herein merely to describe points of reference and do not limit the present invention embodiments to any particular orientation or configuration.

From the foregoing description, it will be appreciated that the invention makes available a novel method and apparatus for steering radio frequency beams utilizing photonic crystal structures, wherein a beam steering device utilizes photonic crystal structures (e.g., prisms, etc.) to steer or direct RF beam transmissions.

Having described preferred embodiments of a new and improved method and apparatus for steering radio frequency beams utilizing photonic crystal structures, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An apparatus for manipulating a radio frequency (RF) beam, comprising:
    a platform;
    a first prism mounted on the platform;
    a second prism mounted on the platform;

a controller that rotates the first prism and the second prism to steer an RF beam that is transmitted successively through the first prism and the second prism; and a compensation device configured to compensate for movement of the platform by further rotating the first prism and the second prism in response to the movement of the platform.

2. The apparatus of claim 1, wherein the first prism and the second prism each comprises a photonic crystal structure that respectively produce an electromagnetic field to steer the RF beam.

3. The apparatus of claim 1, wherein the compensation device comprises an accelerometer.

4. The apparatus of claim 3, further comprising a temperature compensation sensor.

5. The apparatus of claim 1, wherein the compensation device comprises a tilt sensor.

6. The apparatus of claim 1, wherein the compensation device comprises a counterweight coupled to at least one of the first prism and the second prism.

7. The apparatus of claim 6, wherein the compensation device further comprises a right-angle drive.

8. The apparatus of claim 6, wherein the counterweight is in the form of a pendulum.

9. The apparatus of claim 1, wherein the apparatus is mounted on mast.

10. The apparatus of claim 1, wherein at least one of the first prism and the second prism includes a refraction layer including a photonic crystal structure to refract the RF beam, and at least one impedance matching layer to impedance match the refraction layer.

11. An apparatus for manipulating a radio frequency (RF) beam comprising:

a first beam manipulating assembly including a first beam manipulating device to refract said RF beam, wherein said first beam manipulating device includes a first photonic crystal structure that produces an electromagnetic field to refract said RF beam;

a second beam manipulating assembly including a second beam manipulating device to steer said refracted RF beam from said first beam manipulating device at a desired angle, wherein said second beam manipulating device includes a second photonic crystal structure that produces an electromagnetic field to steer said RF beam; and a compensation device to compensate for a combined movement of said first and second beam manipulating assemblies, wherein said first and second beam manipulating assemblies orient said first and second beam manipulating devices relative to each other to steer said RF beam at said desired angle.

12. A method of manipulating a radio frequency (RF) beam, comprising:

refracting said RF beam by producing an electromagnetic field via a first photonic crystal structure within a first beam manipulating device;

steering said refracted RF beam from said first beam manipulating device at a desired angle by producing an electromagnetic field via a second photonic crystal structure within a second beam manipulating device;

orienting said first and second beam manipulating devices relative to each other to steer said RF beam at said desired angle;

sensing a combined movement of said first photonic crystal structure within said first beam manipulating device and said second photonic crystal structure within said second beam manipulating device; and compensating for the combined movement by further orienting said first and second beam manipulating devices relative to each other.

13. The method of claim 12, wherein sensing the combined movement comprises receiving signals from an accelerometer.

14. The method of claim 13, further comprising compensating for an effect of temperature on the accelerometer.

15. The method of claim 12, wherein sensing the combined movement comprises monitoring a tilt sensor.

16. The method of claim 12, wherein compensating for the combined movement comprises driving a motor associated with at least one of said first and second beam manipulating devices.

17. The method of claim 12, wherein compensating for the combined movement comprises responding to a counterweight associated with at least one of said first and second beam manipulating devices.

* * * * *